United States Patent
Kawano et al.

(10) Patent No.: US 12,492,669 B2
(45) Date of Patent: Dec. 9, 2025

(54) GENERATOR

(71) Applicant: HONDA MOTOR CO., LTD., Tokyo (JP)

(72) Inventors: Kohei Kawano, Wako (JP); Hiroaki Kojima, Wako (JP); Jun Yamamoto, Wako (JP); Mitsuhiro Ito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/694,814

(22) PCT Filed: Sep. 30, 2021

(86) PCT No.: PCT/JP2021/036156
§ 371 (c)(1),
(2) Date: Mar. 22, 2024

(87) PCT Pub. No.: WO2023/053347
PCT Pub. Date: Apr. 6, 2023

(65) Prior Publication Data
US 2024/0401551 A1    Dec. 5, 2024

(51) Int. Cl.
  *F02M 37/00*    (2006.01)
  *F02M 25/08*    (2006.01)
  *F02B 63/04*    (2006.01)

(52) U.S. Cl.
  CPC .... *F02M 37/0094* (2013.01); *F02M 25/0872* (2013.01); *F02B 63/048* (2013.01); *F02M 37/0082* (2013.01)

(58) Field of Classification Search
  CPC .......... F02M 37/0094; F02M 25/0872; F02M 37/0041; F02M 37/007; F02M 37/0011;
(Continued)

(56) References Cited

U.S. PATENT DOCUMENTS 1,364,770 A * 1/1921 Lindberg ............ F01M 11/067
                                              244/135 R
1,366,438 A * 1/1921 Wagenhorst ........ A62B 18/086
                                              137/209
(Continued)

FOREIGN PATENT DOCUMENTS

JP    S55-160674 A    12/1980
JP    S61-131387 U1    8/1986
(Continued)

OTHER PUBLICATIONS

Notification of Transmittal of Translation of the International Preliminary Report on Patentability corresponding to International Application No. PCT/JP2021/036156, mailing date Apr. 4, 2024, 4 pages.

(Continued)

*Primary Examiner* — Craig J Price
(74) *Attorney, Agent, or Firm* — Rankin, Hill & Clark LLP

(57) ABSTRACT

A generator capable of suppressing leakage of a liquid fuel includes a fuel tank that stores the liquid fuel. The fuel tank has a fuel inlet, a tank bulge portion that has the fuel inlet and that bulges to a position higher than the fuel inlet, and a breather path formed of a pipe member communicating between an inside and an outside of the fuel tank. The tank bulge portion is provided with an isolated body forming an isolated space that is isolated from an internal space of the fuel tank. An end part on one side of the pipe member is accommodated inside the isolated body.

2 Claims, 5 Drawing Sheets

(58) Field of Classification Search
CPC ...... F02M 37/00; F02M 37/082; F02B 63/04; F02B 63/047; F02B 63/048; Y10T 137/4824; Y10T 137/86187–86228; Y10T 137/86324–86348; B60K 15/03504
USPC .. 137/571–576, 588, 587, 43, 176, 246–267
See application file for complete search history.

(56) References Cited

U.S. PATENT DOCUMENTS

| | | | | |
|---|---|---|---|---|
| 2,240,277 A * | 4/1941 | Zoder | ............... | F16K 17/00 222/335 |
| 2,313,773 A * | 3/1943 | Samiran | ............... | F02M 33/02 137/197 |
| 2,586,671 A * | 2/1952 | Landis | ............... | F01M 5/04 137/340 |
| 2,975,793 A * | 3/1961 | Klank, Jr. | ............... | B64D 37/34 137/43 |
| 2,982,374 A * | 5/1961 | Hughes | ............... | B64D 37/34 96/187 |
| 3,259,752 A * | 7/1966 | Soichiro | ............... | F02B 63/04 290/1 R |
| 3,804,292 A * | 4/1974 | Chiti | ............... | B65D 90/52 220/88.1 |
| 3,907,153 A * | 9/1975 | Mutty | ............... | B60K 15/035 141/59 |
| 3,910,302 A * | 10/1975 | Sudhir | ............... | B60K 15/03519 220/746 |
| 3,917,109 A * | 11/1975 | MacDonald | ..... | B60K 15/03504 220/746 |
| 4,166,550 A * | 9/1979 | Kleinschmit | .... | B60K 15/03504 220/746 |
| 4,531,653 A * | 7/1985 | Sakata | ............... | B60K 15/03504 220/746 |
| 4,587,992 A * | 5/1986 | Thompson | ............... | F15B 1/26 137/264 |
| 4,760,858 A * | 8/1988 | Szlaga | ............... | F16K 17/36 220/746 |
| 4,991,615 A * | 2/1991 | Szlaga | ............... | F16K 17/19 137/410 |
| 5,285,998 A * | 2/1994 | Zink | ............... | F16K 27/07 137/454.6 |
| 5,406,995 A * | 4/1995 | Gantzer | ............... | B67D 7/74 73/426 |
| 6,084,313 A * | 7/2000 | Frank | ............... | H02J 9/066 290/40 C |
| 6,439,206 B1 * | 8/2002 | Shimamura | ............... | F16K 24/044 137/202 |
| 7,270,117 B1 * | 9/2007 | Devall | ............... | F02M 37/20 123/516 |
| 11,002,183 B1 * | 5/2021 | Zhu | ............... | F02B 63/048 |
| 11,187,147 B2 * | 11/2021 | Kojima | ............... | F02B 63/044 |
| 2002/0011265 A1 * | 1/2002 | Ganachaud | ...... | B60K 15/03519 137/43 |
| 2016/0160753 A1 * | 6/2016 | Boutot | ............... | F02B 63/048 220/23.83 |
| 2021/0340903 A1 | 11/2021 | Kojima et al. | | |
| 2024/0384695 A1 * | 11/2024 | Matsunaga | ............... | F02B 63/048 |

FOREIGN PATENT DOCUMENTS

| | | |
|---|---|---|
| JP | 2013-036426 A | 2/2013 |
| JP | 2013-095231 A | 5/2013 |
| WO | 2020/049697 A1 | 3/2020 |

OTHER PUBLICATIONS

International Search Report Corresponding to International Application No. PCT/JP2021/036156, dated Nov. 30, 2021, 2 pages.
International Preliminary Report on Patentability, Corresponding to International Application No. PCT/JP2021/036156, Mailing Date Apr. 26, 2022, 6 pages.

* cited by examiner

GENERATOR

TECHNICAL FIELD

The present invention relates to a generator.

BACKGROUND ART

There has conventionally been a generator capable of suppressing leakage of a liquid fuel even when the generator is inclined in a predetermined direction. The generator includes a fuel tank having a tank bulge portion being a portion higher than a fuel inlet and a breather path communicating between the outside and the inside of the fuel tank. The breather path includes, in the fuel tank, an opening positioned above the liquid fuel inside the tank bulge portion when the generator is inclined toward the right or the left (see, for example, Patent Literature 1).

CITATION LIST

Patent Literature

Patent Literature 1
International Publication No. WO 2020/049697

SUMMARY OF INVENTION

Technical Problem

However, in the conventional configuration, when a liquid fuel is supplied to a fuel tank in an amount exceeding a specified amount, there is a possibility that the fuel may enter the breather path and leak.

The present invention provides a generator capable of suppressing leakage of a liquid fuel.

Solution to Problem

The present invention is a generator including a fuel tank that stores a liquid fuel, the fuel tank having a fuel inlet, a tank bulge portion that has the fuel inlet and that bulges to a position higher than the fuel inlet, and a breather path formed of a pipe member communicating between an inside and an outside of the fuel tank, in which the tank bulge portion is provided with an isolated body forming an isolated space that is isolated from an internal space of the fuel tank, and an end part on one side of the pipe member is accommodated inside the isolated body.

Advantageous Effects of Invention

According to the present invention, leakage of a liquid fuel can be suppressed.

DESCRIPTION OF EMBODIMENT

Figure 1:
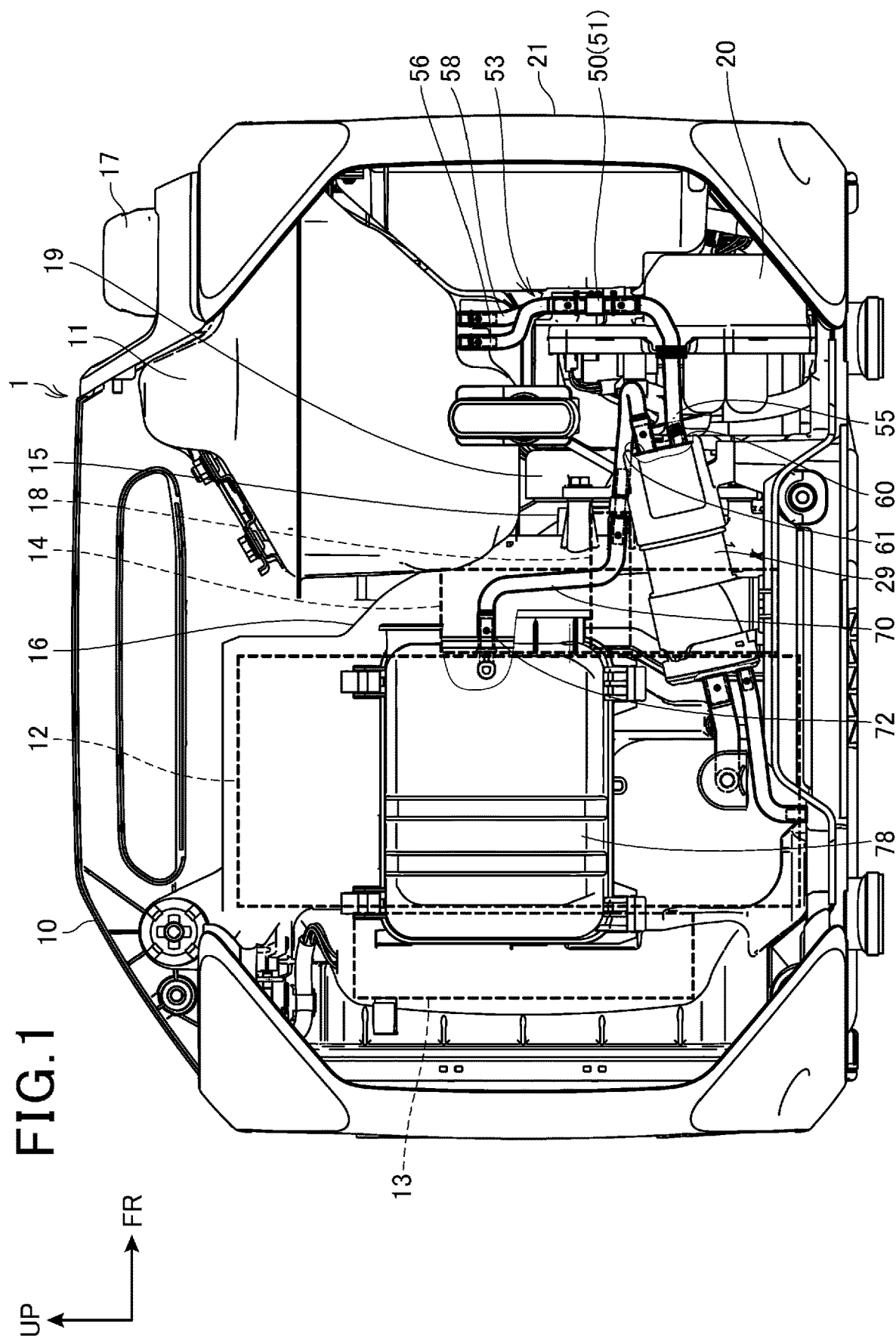
FIG. 1 is a configuration view of a generator according to the present embodiment.

FIG. 1 is a configuration view of a generator 1.

The generator 1 includes an outer casing 10. Inside the outer casing 10, a fuel tank 11, an engine 12, a muffler 13, an alternator 14, a fan 15, and a shroud 16 are disposed.

The fuel tank 11 includes a fuel inlet that can be accessed from an outside, and fuel can be put into the fuel tank 11 through the fuel inlet. A fuel inlet cap 17 is removably mounted on the fuel inlet.

The engine 12 is an ignition air-cooled engine driven by the fuel inside the fuel tank 11. The engine 12 includes a cylinder, a piston that reciprocates inside the cylinder, and a crankshaft 18 that is coupled to the piston through a connecting rod.

An intake pipe connected to the engine 12 is provided with a throttle valve and a fuel supply device. Air of which the volume is adjusted by the throttle valve and fuel supplied from the fuel supply device are mixed, and this air-fuel mixture is supplied to the engine 12. The engine 12 combusts the air-fuel mixture in a combustion chamber to drive the piston and thereby rotates the crankshaft 18 through the connecting rod.

The muffler 13 is connected to an outlet of an exhaust pipe connected to the engine 12. The muffler 13 serves purposes such as reducing the exhaust sound level.

The fuel to drive the engine 12 may be gasoline or may be a liquid fuel other than gasoline. The fuel supply device may have a configuration using an injector or a configuration using a carburetor.

The generator 1 includes a control unit. The control unit has a processor, such as a central processing unit (CPU), and a memory, such as a read-only memory (ROM). The control unit controls parts of the generator 1 as the processor executes a program stored in the memory. The control unit functions as, for example, an electronic control unit (ECU) that outputs control signals for controlling the output of the engine 12.

The alternator 14 is mounted to the crankshaft 18 of the engine 12. The alternator 14 is a multipolar alternator that is driven by the engine 12 to generate alternating-current electricity. The alternator 14 has a rotor that rotates integrally with the crankshaft 18, and a stator that is disposed concentrically with the rotor so as to face a circumferential surface of the rotor.

The rotor is provided with a permanent magnet. The stator is provided with U-phase, V-phase, and W-phase windings that are disposed at a phase angle of, for example, 120 degrees to one another.

The fan 15 is mounted on the crankshaft 18. On the crankshaft 18, a starting device 19 for starting the engine 12 is disposed. When the engine 12 is driven, electricity is generated by the alternator 14. When the engine 12 is driven, the fan 15 rotates, sending cooling air to the engine 12. The alternator 14 generates alternating-current electricity.

The shroud 16 includes an opening used for ventilation for taking in air. The shroud 16 covers the alternator 14 and the fan 15 and thereby guides the air sent by the fan 15 to the periphery of the engine 12.

The outer casing 10 includes an intake port through which outside air is taken in and an exhaust port through which air having cooled the engine 12 is discharged.

The generator 1 includes an inverter 20. The inverter 20 controls the voltage and the frequency of the alternating-current electricity generated by the alternator 14 so as to stabilize the output.

The generator 1 further includes a control panel 21. The control panel 21 is provided with an electrical outlet, an operating switch, and others.

The electrical outlet is supplied with alternating-current electricity from the inverter 20. A plug of a device that uses generated electricity is connected to the electrical outlet. Alternatively, the electrical outlet may be supplied with direct-current electricity.

In FIG. 1, for the directions in a state of the generator 1 being installed for use, the upper side is denoted by reference sign UP and the front side is denoted by FR. Hereinafter, the state of the generator 1 being installed for use is referred to as an installed state.

An air cleaner case 78 is disposed on a lateral side of the engine 12. In the present embodiment, the air cleaner case 78 is disposed on a side opposite to the muffler 13 across the engine 12.

The fuel tank 11 is provided with a pipe member 50. The pipe member 50 is a member to allow an internal space S1 of the fuel tank 11 and the outside of the fuel tank 11 to communicate with each other. The inside of the pipe member 50 functions as a breather path 51 for flowing an evaporated fuel, which is a fuel turned into a gas form through vaporization, in the internal space S1 and releasing the evaporated fuel to the outside of the fuel tank 11.

The evaporated fuel is released to the outside of the fuel tank 11 via the breather path 51, so that the fluctuation of the pressure inside the fuel tank 11 due to change in the outside air temperature, consumption of the liquid fuel, and the like can be suppressed in the generator 1. As a result, in the generator 1, the fuel can be appropriately supplied to the engine 12 and demands for the strength of the fuel tank 11 and the pressure resistance of the fuel system components are restrained.

A canister 29 is provided on the lateral side of the engine 12. In the present embodiment, the canister 29 is disposed below the air cleaner case 78. The canister 29 collects the evaporated fuel by causing the evaporated fuel vaporized in the internal space S1 of the fuel tank 11 to be absorbed by an absorbing material such as activated carbon to be accumulated. With the canister 29 provided, the generator 1 can easily meet a regulatory value when an emission amount of gas including the evaporated fuel is regulated.

An end part 53 on one side of the pipe member 50 branches into a first pipe member 56 and a second pipe member 58. The first pipe member 56 and the second pipe member 58 are both inserted into the internal space S1 (FIG. 2) of the fuel tank 11. In the present embodiment, the first pipe member 56 and the second pipe member 58 are formed of a rigid pipe member such as a metal pipe.

An end part 55 on the other side of the pipe member 50 is connected to a first connection port 60 provided in the canister 29.

Further, the canister 29 is provided with a second connection port 61, and an end part 71 on one side of a supply pipe 70 that is a tubular member is connected to the second connection port 61. An end part 72 on the other side of the supply pipe 70 is connected to the air cleaner case 78.

The evaporated fuel absorbed in the canister 29 is removed from the canister 29 while the engine 12 is halted, and is supplied to an air cleaner case 90 via the supply pipe 70.

Next, the structure of the fuel tank 11 will be further described.

Figure 2:
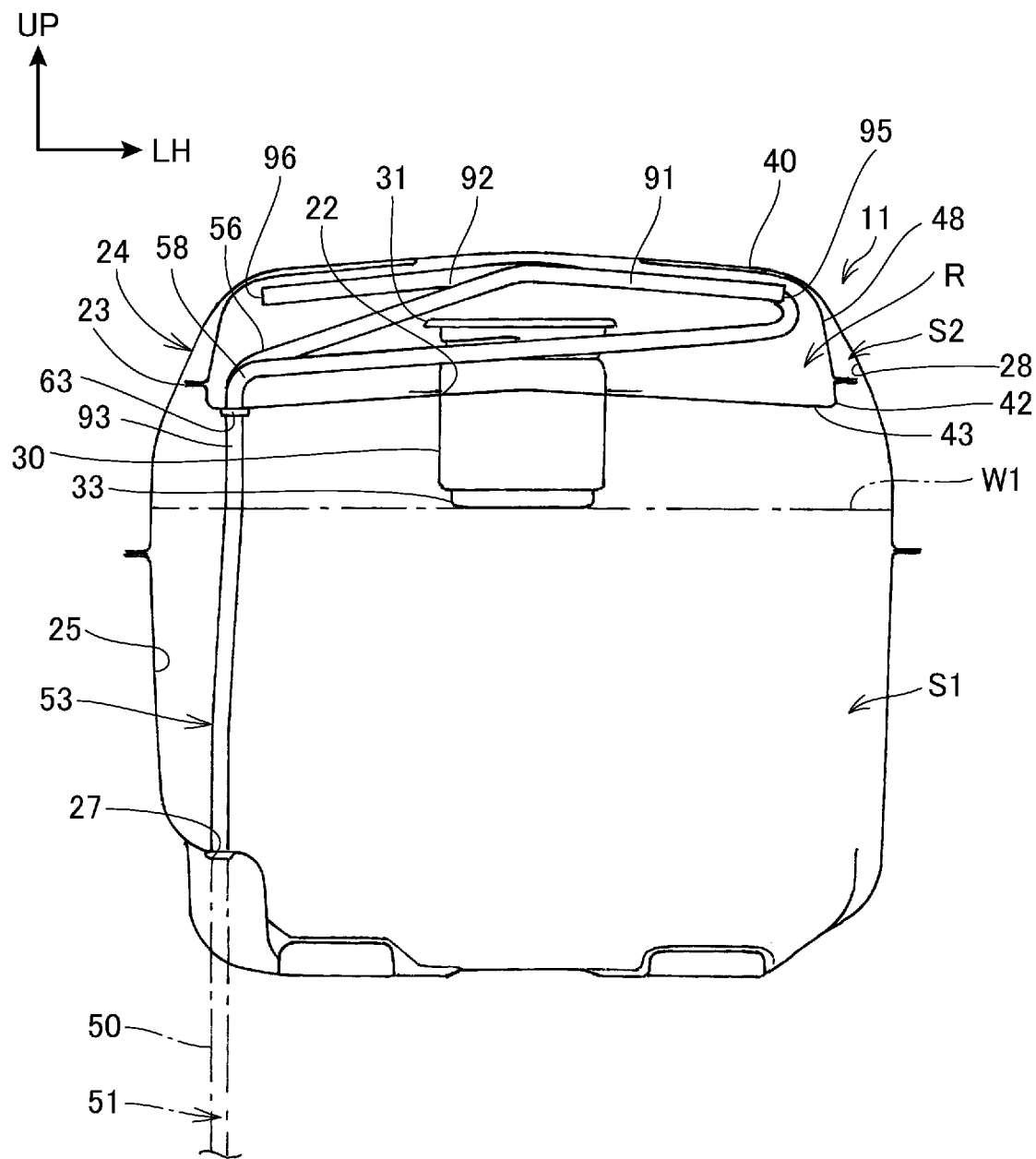
FIG. 2 is a longitudinal cross-sectional view of a fuel tank.
Figure 3:
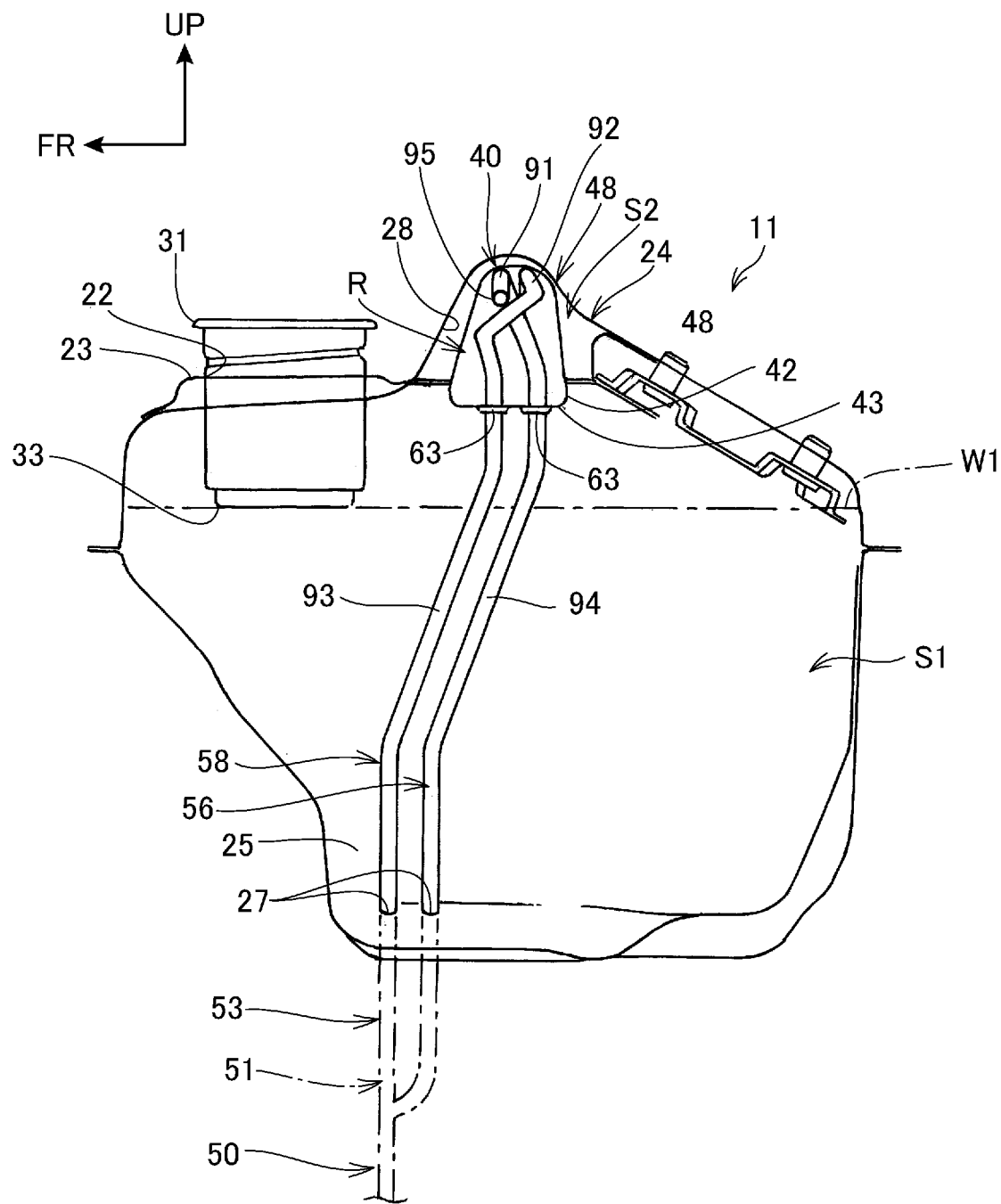
FIG. 3 is a longitudinal cross-sectional view of the fuel tank.

FIG. 2 and FIG. 3 are longitudinal cross-sectional views of the fuel tank 11. In FIG. 2 and FIG. 3 and the following drawings, UP indicates the upper side, FR indicates the front side, and LH indicates the left side. The directions indicated by these reference signs correspond to the directions of the generator 1 shown in FIG. 1. FIG. 2 is a view of the fuel tank 11 as viewed from the front side of the generator 1, and FIG. 3 is a view of the fuel tank 11 as viewed from the left side of the generator 1. In FIG. 2 and FIG. 3, an imaginary line W1 indicates a liquid level of a liquid fuel when the liquid fuel is refueled to the internal space S1 in an amount in which the liquid fuel reaches a lower end 33 of a fuel pipe 30.

As shown in FIG. 2 and FIG. 3, the fuel tank 11 includes the internal space S1 in which the liquid fuel can be stored.

As shown in FIG. 3, a top face 23 of the fuel tank 11 is provided with an opening 22, and the fuel pipe 30 that is a cylindrical member is inserted through the opening 22. An upper end 31 of the fuel pipe 30 projects to the outside of the fuel tank 11 and an opening of the upper end 31 of the fuel pipe 30 functions as a fuel inlet. Inside the fuel tank 11, the lower end 33 side of the fuel pipe 30 extends toward a bottom portion of the fuel tank 11, with a predetermined width dimension.

Note that in the present embodiment, when a liquid fuel in an amount assumed to be the upper limit of the liquid fuel that can be refueled to the generator 1, that is, a liquid fuel in a specified amount is input to the fuel tank 11, the liquid level of the liquid fuel stored in the internal space S1 is positioned below the lower end 33 of the fuel pipe 30.

The fuel tank 11 is provided with a tank bulge portion 24 that is formed by the top face 23 bulging to a position higher than the upper end 31 of the fuel pipe 30. The tank bulge portion 24 is disposed on the rear side relative to the opening 22 on the top face 23. The tank bulge portion 24 is disposed such that the longitudinal direction extends along the left-right direction of the fuel tank 11 and the generator 1. Hereinafter, the left-right direction of the fuel tank 11 and the generator 1 is referred to as a width direction.

As shown in FIG. 3, the tank bulge portion 24 is formed so as to have a V-shaped cross-section with the front-rear length narrowing toward the upper side. Inside the fuel tank 11, a bulge space S2 corresponding to the inside of the tank bulge portion 24 is continuous with the internal space S1. In other words, the tank bulge portion 24 is provided integrally with the fuel tank 11.

Figure 4:
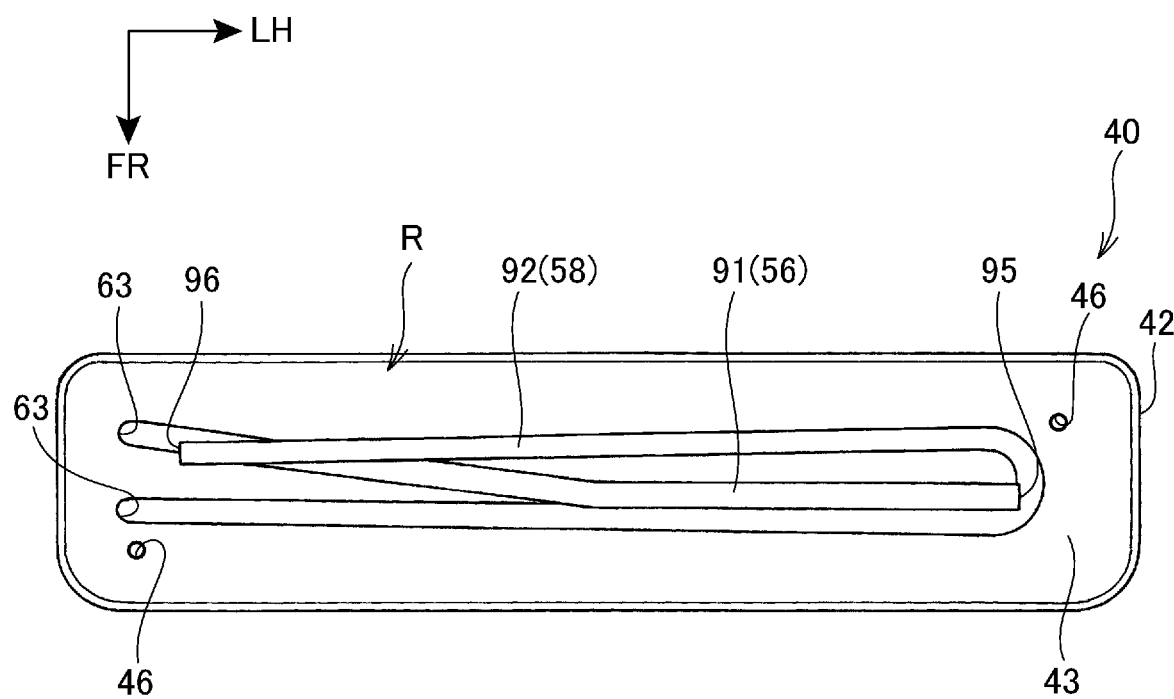
FIG. 4 is a plan view showing an isolated body.

FIG. 4 is a plan view of an isolated body 40. In FIG. 4, illustration of an upper shell portion 48 is omitted.

As shown in FIG. 2 and FIG. 3, the bulge space S2 is provided with the isolated body 40. The isolated body 40 is a housing having an isolated space R inside and having a shape that can be accommodated in the bulge space S2. As shown in FIG. 4, the isolated body 40 has a predetermined linear dimension with the longitudinal direction extending along the left-right direction of the fuel tank 11, and the linear dimension is substantially the same as the linear dimension in the longitudinal direction of the tank bulge portion 24.

The isolated body 40 is formed by bonding together, through welding or the like, a lower shell portion 42 constituting a lower portion of the isolated body 40 and the upper shell portion 48 constituting an upper portion of the isolated body 40.

The upper shell portion 48 is formed so as to follow an inner circumferential wall 28 as a circumferential surface positioned on the internal space S1 side of the tank bulge portion 24. The lower shell portion 42 has a flat plate shape forming a bottom surface 43 of the isolated body 40. The lower shell portion 42 is formed in a rectangle in a plan view.

In this manner, the isolated body 40 is formed in an upper-lower separate structure, so that an upper surface and a lower surface are easily formed in a complicated shape having recesses and projections or inclinations and can be formed in a shape that can be accommodated in the tank bulge portion 24.

In the isolated body 40 accommodated in the tank bulge portion 24, the bottom surface 43 is disposed on substantially the same plane as a portion where the opening 22 of the top face 23 of the fuel tank 11 is provided. In other words, the bottom surface 43 is disposed at a position substantially the same as the position of the opening 22 of the top face 23 in the up-down direction of the fuel tank 11. Note that the bottom surface 43 is disposed, in the up-down direction of the fuel tank 11, above the lower end 33 of the fuel pipe 30 and below the upper end 31 of the fuel pipe 30.

The bottom surface 43 of the isolated body 40 is provided with a pair of ventilation holes 46. The pair of ventilation holes 46 are respectively provided at each of both ends in a longitudinal direction of the bottom surface 43. In the present embodiment, the pair of ventilation holes 46 are provided at corner portions of the bottom surface 43 so as to be diagonally positioned with each other on the bottom surface 43. The ventilation holes 46 allow the internal space S1 and the isolated space R to communicate with each other.

As stated above, when the liquid fuel in a specified amount is refueled to the generator 1, the liquid level of the liquid fuel stored in the internal space S1 is positioned below the lower end 33 of the fuel pipe 30.

When the fuel in an amount equal to or greater than the specified amount is refueled to the fuel tank 11, the lower end 33 is blocked by the liquid level of the liquid fuel stored in the internal space S1. As a result, when the liquid fuel is further refueled to the fuel tank 11, the air in the internal space S1 of the fuel tank 11 and the liquid fuel refueled to the fuel tank 11 are not exchanged, whereby the liquid fuel is stored inside the fuel pipe 30 without flowing into the internal space S1. In other words, in the generator 1 in the installed state, the positioning of the liquid level of the liquid fuel in the internal space S1 above the imaginary line W1 shown in FIG. 2 and FIG. 3 is suppressed.

Further, in the generator 1, the liquid fuel is stored inside the fuel pipe 30 without flowing into the internal space S1, so that the refueling of the liquid fuel in an amount equal to or greater than the specified amount to the fuel tank 11 can be indicated to a user who refuels the liquid fuel.

As stated above, the lower end 33 of the fuel pipe 30 projects toward a lower side of the fuel tank 11 from the bottom surface 43 of the isolated body 40, with a predetermined width dimension. In other words, the bottom surface 43 of the isolated body 40 is positioned above the lower end 33. Further, the bottom surface 43 of the isolated body 40 is provided so as to be positioned above the liquid level even when the liquid level of the liquid fuel rises due to increase in temperature or the like in a state with the fuel in the specified amount refueled.

In this manner, in the generator 1 in the installed state, reaching of the liquid level of the liquid fuel in the internal space S1 to the bottom surface 43 is suppressed. Therefore, in the generator 1 in the installed state, the inflow of the liquid fuel into the isolated space R through the ventilation holes 46 is suppressed and in the fuel tank 11, the inflow of the liquid fuel into the isolated space R of the isolated body 40 from the internal space S1 is suppressed.

As shown in FIG. 2 and FIG. 3, the first pipe member 56 and the second pipe member 58 are respectively inserted through a pair of communication holes 27 provided on a side face 25 of the fuel tank 11, so that a part of each member is disposed in the internal space S1. The pipe members 50 disposed in the internal space S1 are routed toward the isolated body 40 and are respectively inserted through a pair of insertion holes 63 provided in the bottom surface 43 of the isolated body 40. Then, the first pipe member 56 and the second pipe member 58 are accommodated in the isolated space R.

As shown in FIG. 4, in the isolated space R, the first pipe member 56 is integrally provided with a distal end part 91 in a linear shape extending along a direction from the left side to the right side of the isolated body 40 and a proximal end part 93 in a linear shape bending from a side opposite to a first opening end 95 as a distal end of the distal end part 91 and extending downward along the side face 25 of the fuel tank 11.

In this manner, the first opening end 95 as a distal end on one side of the pipe member 50 and as a distal end on one side of the first pipe member 56 is disposed on the left side of the tank bulge portion 24 and the isolated body 40. The first opening end 95 functions as an inlet of the breather path 51.

The second pipe member 58 is integrally provided with a distal end part 92 in a U-shape extending along a direction from the right side toward the left of the isolated body 40 and then folding back to extend along a direction toward the right and a proximal end part 94 in a linear shape bending from a side opposite to a second opening end 96 as a distal end of the distal end part 92 and extending downward along a side wall of the fuel tank 11. In this manner, the second opening end 96 as the distal end on one side of the pipe member 50 and as a distal end on one side of the second pipe member 58 is disposed on the right side of the tank bulge portion 24 and the isolated body 40.

The proximal end parts 93, 94 of the respective first pipe member 56 and second pipe member 58 are respectively inserted through the pair of insertion holes 63 and extend to the outside of the fuel tank 11.

In this manner, since the first opening end 95 of the first pipe member 56 and the second opening end 96 of the second pipe member 58 are separately disposed on the opposite left and right sides of the isolated space R, when the fuel tank 11 is inclined to the right to lower the right side, it is easy to maintain the state of the inside and the outside of the fuel tank 11 in communication with each other by means of the first pipe member 56 having the first opening end 95 that opens to the left side. Further, when the fuel tank 11 is inclined to the left to lower the left side, it is easy to maintain the state of the inside and the outside of the fuel tank 11 in communication with each other by means of the second pipe member 58 having the second opening end 96 that opens to the right side.

Next, a flow of an evaporated fuel in the generator 1 will be described.

In the generator 1 in the installed state, the liquid fuel stored in the internal space S1 of the fuel tank 11 is occasionally vaporized to become an evaporated fuel in a gas form. The evaporated fuel flows into the isolated space R from the internal space S1 via the ventilation holes 46.

The evaporated fuel that has reached the isolated space R flows into the breather path 51 through the first opening end 95 and the second opening end 96 of the pipe member 50 and passes through the breather path 51 to be released to the outside of the fuel tank 11.

As stated above, in the generator 1 in the installed state, reaching of the liquid level of the liquid fuel in the internal space S1 to the bottom surface 43 is suppressed. As a result, blocking of the ventilation holes 46 by the liquid fuel refueled to the internal space S1 is suppressed and blocking of the release of the evaporated fuel from the internal space S1 of the fuel tank 11 is suppressed.

When the generator 1 is used, there is a possibility that the generator 1 is inclined or topples over in the front, rear, left, and right directions from the installed state. In such a case, there is a possibility that similarly to the evaporated fuel, the liquid fuel refueled to the internal space S1 flows into the breather path 51 and leaks to the outside of the fuel tank 11 via the breather path 51.

In the present embodiment, the isolated space R where the end part 53 on one side of the pipe member 50 is disposed is provided. The isolated space R is isolated from the internal space S1 of the fuel tank 11 by the isolated body 40.

In this manner, in the generator 1, even when the generator 1 is inclined or topples over in any of the front, rear, left, and right directions from the installed state, reaching of the liquid fuel to the first opening end 95 and the second opening end 96 is suppressed. Therefore, in the generator 1, the leakage of the liquid fuel refueled to the internal space S1 to the outside of the fuel tank 11 is suppressed.

The generator 1 of the present embodiment is formed such that the linear dimension in the width direction is shorter than the linear dimension in the front-rear direction. Therefore, the generator 1 is more likely to relatively topple over in the left-right direction. Thus, also in a case of a toppled state inclined to the left or the right by 90 degrees, the fuel flows into either the first opening end 95 or the second opening end 96.

When the fuel tank 11 topples over to the right, since the first opening end 95 of the first pipe member 56 is positioned above the liquid fuel inside the tank bulge portion 24, change in the pressure inside the fuel tank 11 is suppressed by the first pipe member 56.

In this case, the liquid fuel flows into the second opening end 96 of the second pipe member 58. The second pipe member 58 is routed so as to include a position above the liquid fuel, even when the fuel tank 11 topples over to the right. As a result, the liquid fuel does not flow into the upper side relative to the position, and the liquid fuel does not flow toward the canister 29 side from the second pipe member 58. Accordingly, even when the generator 1 is largely inclined toward the right, the liquid fuel does not leak from the first pipe member 56 and the second pipe member 58.

When the fuel tank 11 topples over to the left, since the second opening end 96 of the second pipe member 58 is positioned above the liquid fuel inside the tank bulge portion 24, change in the pressure inside the fuel tank 11 is suppressed by the second pipe member 58.

In this case, the liquid fuel flows into the first opening end 95 of the first pipe member 56. The first pipe member 56 is routed so as to include a position above the liquid fuel, even when the fuel tank 11 topples over to the left. As a result, the liquid fuel does not flow toward the canister 29 side from the first pipe member 56 and the liquid fuel does not leak from the first pipe member 56 and the second pipe member 58.

Further, in the present embodiment, the first pipe member 56 and the second pipe member 58 are formed to have a downward slope in which the distal end parts 91 and 92 including the respective first opening end 95 and second opening end 96 are inclined downward toward the respective first opening end 95 and second opening end 96.

As a result, even if the liquid fuel has waves or the like generated in the fuel tank 11 due to vibration or the like from the outside, and enters the first opening end 95 and the second opening end 96, the liquid fuel can be easily returned to fuel tank 11.

Note that the downward slope angle of the respective distal end parts 91 and 92 may be appropriately set to an angle at which the liquid fuel that has entered the first opening end 95 and the second opening end 96 can be easily returned to the fuel tank 11, through simulation, experiment, or the like.

Figure 5:
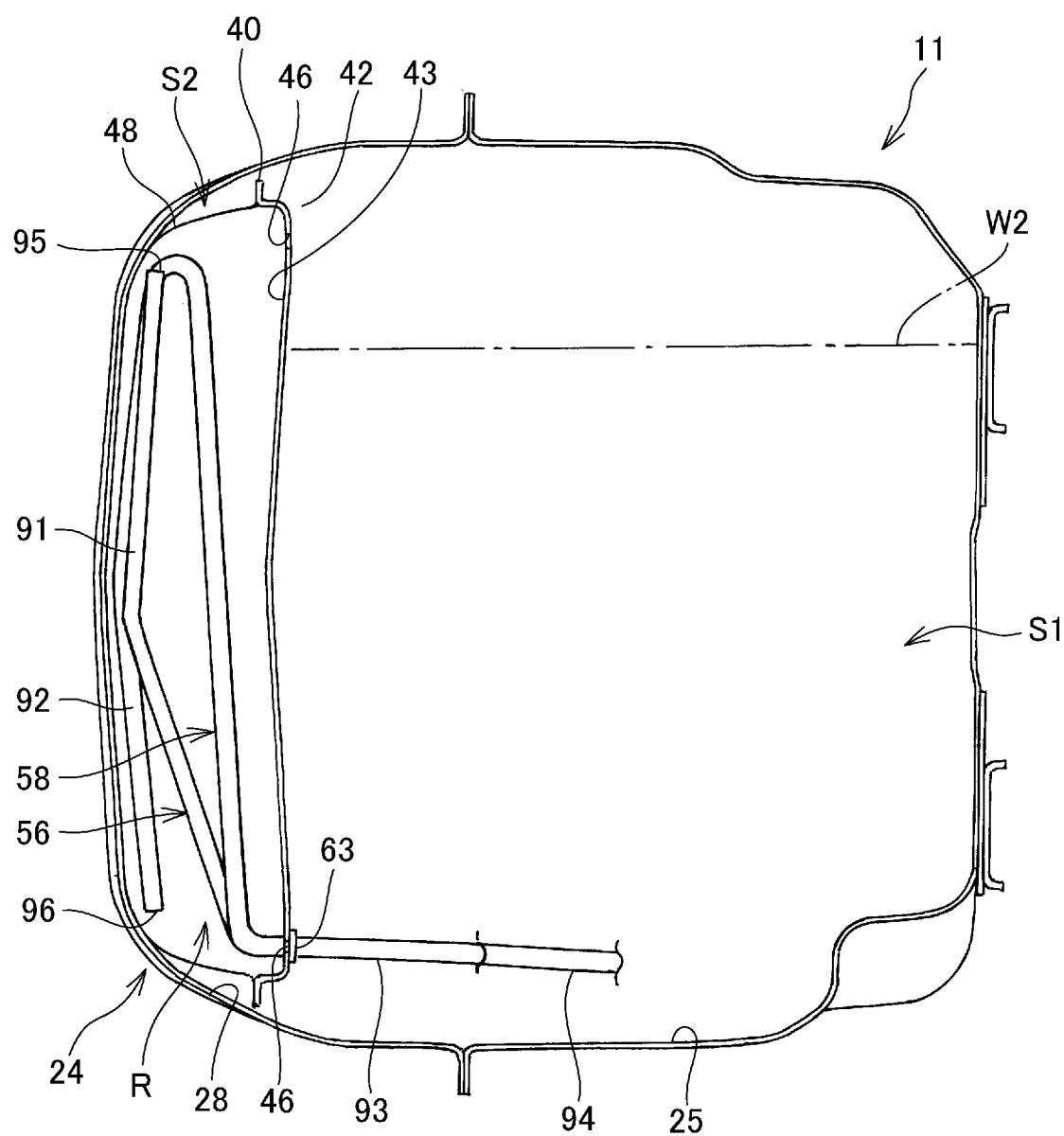
FIG. 5 is a view showing an inside of the fuel tank when the generator topples over to the right side.

FIG. 5 is a view showing an inside of the fuel tank 11 when the generator 1 topples over to the right side. In FIG. 5, an imaginary line W2 indicates the liquid level of the liquid fuel when the liquid fuel in a specified amount is refueled to the internal space S1.

As shown in FIG. 5, when the generator 1 topples over to the right side, the liquid fuel is instantly blocked by the isolated space R and is spread to the internal space S1 excluding the isolated space R. Further, in this case, the evaporated fuel is occasionally generated from the liquid fuel due to the impact of the toppling.

As stated above, the pair of ventilation holes 46 are respectively provided at each of the both ends in the longitudinal direction of the bottom surface 43. Therefore, when the generator 1 topples over to the right side, at least one of the pair of ventilation holes 46 is positioned above the liquid level, which is indicated by the imaginary line W2, of the liquid fuel at the time of toppling.

The evaporated fuel generated due to the toppling of the generator 1 passes through the ventilation hole 46 positioned above the liquid level indicated by the imaginary line W2 and enters the isolated space R, and then enters the first opening end 95 and is discharged to the outside of the fuel tank 11 via the breather path 51.

Further, when the generator 1 topples over to the right side, the liquid fuel may occasionally pass through the ventilation hole 46 positioned below the liquid level indicated by the imaginary line W2 and enter the isolated space R. Even in such a case, the evaporated fuel generated due to the toppling of the generator 1 is discharged to the outside of the fuel tank 11 from the first pipe member 56 via the breather path 51.

In this manner, in the pipe member 50 and the breather path 51, a difference in the internal pressure between the first pipe member 56 and the second pipe member 58 does not occur, and the liquid fuel does not flow toward the canister 29 side from the second pipe member 58. Accordingly, in the generator 1, even when the generator 1 is largely inclined toward the right, the leakage of the liquid fuel from the pipe member 50 is suppressed. Note that also when the generator 1 topples over to the left side, in the generator 1, the leakage of the liquid fuel from the pipe member 50 is similarly suppressed.

As described above, the fuel tank 11 includes the upper end 31 of the fuel pipe 30, the tank bulge portion 24 that has the upper end 31 of the fuel pipe 30 and that bulges to a position higher than the upper end 31 of the fuel pipe 30, and the breather path 51 formed of the pipe member 50 communicating between the inside and the outside of the fuel tank 11. Further, the tank bulge portion 24 is provided with the isolated body 40 forming the isolated space R that is isolated from the internal space S1 of the fuel tank 11, and the end part 53 on one side of the pipe member 50 is accommodated in the isolated body 40.

In this manner, the first pipe member 56 and the second pipe member 58 of the pipe member 50 are isolated from the internal space S1 of the fuel tank 11. Therefore, in the generator 1, even when the generator 1 is inclined or topples over in any of the front, rear, left, and right directions from the installed state, reaching of the liquid fuel to the first opening end 95 and the second opening end 96 is suppressed, so that the leakage of the liquid fuel refueled to the internal space S1 to the outside of the fuel tank 11 is suppressed.

Further, according to the present embodiment, the isolated body 40 is provided with the ventilation holes 46 that allow the tank bulge portion 24 and the inside of the fuel tank 11 to communicate with each other.

In this manner, the evaporated fuel that is the liquid fuel having been stored in the internal space S1 of the fuel tank 11 and vaporized flows into the breather path 51 via the ventilation holes 46 and passes through the breather path 51 to be released to the outside of the fuel tank 11. Therefore, the fluctuation of the pressure inside the fuel tank 11 due to change in the outside air temperature, consumption of the liquid fuel, and the like can be suppressed.

Furthermore, according to the present embodiment, the fuel tank 11 is provided with the fuel pipe 30 coupled to the upper end 31 of the fuel pipe 30 and extending toward the internal space S1 of the fuel tank 11, and the ventilation holes 46 are provided at a position higher than the lower end 33 of the fuel pipe 30.

In this manner, when the fuel in an amount equal to or greater than the specified amount is input to the fuel tank 11, the lower end 33 is blocked by the liquid level of the liquid fuel stored in the internal space S1. As a result, in the generator 1 in the installed state, positioning of the liquid level of the liquid fuel in the internal space S1 above the lower end 33 is suppressed.

Further, according to the present embodiment, the longitudinal direction of the isolated body 40 extends along a direction with a shorter dimension of the generator 1 in a plan view, and each of the both ends in the longitudinal direction of the isolated body 40 are provided with the ventilation hole 46, the ventilation hole being at least one ventilation hole.

According to this, at least one of the pair of ventilation holes 46 is positioned above the liquid level of the liquid fuel at the time of toppling when the generator 1 is in a toppled state inclined by 90 degrees to the left or the right. As a result, the evaporated fuel passes through the ventilation hole 46 positioned above the liquid level indicated by the imaginary line W2 and is discharged to the outside of the fuel tank 11 via the breather path 51, so that blocking of the release of the evaporated fuel from the internal space S1 of the fuel tank 11 is suppressed. Further, the fluctuation of the pressure inside the fuel tank 11 due to change in the outside air temperature, consumption of the liquid fuel, and the like can be suppressed.

The aforementioned embodiment is an exemplary illustration of one aspect of the present invention, and any modification and application are available without departing from the gist of the present invention.

In the aforementioned embodiment, the canister 29 is disposed in the generator 1. However, without being limited to the aforementioned embodiment, in areas where the regulatory value of the emission amount of gas including the evaporated fuel is not so strict or the like, the pipe member 50 may be directly connected to the air cleaner case 78. Further, for example, the pipe member 50 may be opened in a space outside the fuel tank 11.

[Configurations Supported by the Aforementioned Embodiment]

The aforementioned embodiment supports the following configurations.

(Configuration 1) A generator including a fuel tank that stores a liquid fuel, the fuel tank having a fuel inlet, a tank bulge portion that has the fuel inlet and that bulges to a position higher than the fuel inlet, and a breather path formed of a pipe member communicating between an inside and an outside of the fuel tank, in which the tank bulge portion is provided with an isolated body forming an isolated space that is isolated from an internal space of the fuel tank, and an end part on one side of the pipe member is accommodated inside the isolated body.

According to this configuration, the end part on one side of the pipe member is isolated from the internal space of the fuel tank. Therefore, in the generator, even when the generator is inclined or topples over in any of the front, rear, left, and right directions from the installed state, reaching of the liquid fuel to an opening of the pipe member is suppressed, so that the leakage of the liquid fuel refueled to the internal space to the outside of the fuel tank is suppressed.

(Configuration 2) The generator described in Configuration 1, in which the isolated body is provided with a ventilation hole that allows the tank bulge portion and the inside of the fuel tank to communicate with each other.

According to this configuration, the evaporated fuel that is the liquid fuel having been stored in the internal space of the fuel tank and vaporized flows into the breather path via the ventilation hole and passes through the breather path to be released to the outside of the fuel tank. Therefore, the fluctuation of the pressure inside the fuel tank due to change in the outside air temperature, consumption of the liquid fuel, and the like can be suppressed.

(Configuration 3) The generator described in Configuration 2, in which the fuel tank is provided with a cylindrical member coupled to the fuel inlet and extending toward the internal space of the fuel tank, and the ventilation hole is provided at a position higher than a lower end of the cylindrical member.

According to this configuration, in the generator in an installed state, positioning of the liquid level of the liquid fuel in the internal space of the fuel tank above the cylindrical member is suppressed, so that the leakage of the liquid fuel input to the internal space to the outside of the fuel tank via the pipe member is suppressed.

(Configuration 4) The generator described in Configuration 2 or Configuration 3, in which a longitudinal direction of the isolated body extends along a direction with a shorter dimension of the generator in a plan view, and each of the both ends in the longitudinal direction of the isolated body are provided with the ventilation hole, the ventilation hole being at least one ventilation hole.

According to this configuration, even when the generator is inclined or topples over, positioning of the ventilation hole below the liquid level of the liquid fuel stored in the fuel tank is suppressed, so that the leakage of the liquid fuel input to the internal space to the outside of the fuel tank is suppressed. Further, the fluctuation of the pressure inside the fuel tank due to change in the outside air temperature, consumption of the liquid fuel, and the like can be suppressed.

REFERENCE SIGNS LIST 1 generator
11 fuel tank
12 engine
22 opening
23 top face
24 tank bulge portion
25 side face
27 communication hole
29 canister 30 fuel pipe
31 upper end (fuel inlet)
33 lower end
40 isolated body
46 ventilation hole
50 pipe member
51 breather path
52 opening end
53 end part
55 end part
95 first opening end
96 second opening end
R isolated space
S1 internal space
S2 bulge space
W1, W2 imaginary line

The invention claimed is:

1. A generator comprising a fuel tank that stores a liquid fuel, wherein
   into the fuel tank, in a state where the generator is installed for use, a fuel pipe, which is a cylindrical member, is inserted through an opening provided on a top face of the fuel tank, and an upper end of the fuel pipe projects to an outside of the fuel tank and an opening of the upper end of the fuel pipe functions as a fuel inlet,
   inside the fuel tank, a lower end of the fuel pipe extends toward a bottom portion of the fuel tank, with a predetermined dimension, and a liquid level of the liquid fuel stored in an internal space of the fuel tank, when the liquid fuel is in an amount of an upper limit that is refueled, is positioned below the lower end of the fuel pipe,
   in the fuel tank, a tank bulge portion formed by bulging the top face is provided on a lateral side of the opening of the fuel tank,
   the tank bulge portion bulges to a position higher than the upper end of the fuel pipe, and
   the fuel tank is provided with a pipe member communicating between an inside and the outside of the fuel tank,
   an inside of the pipe member functions as a breather path for flowing an evaporated fuel, which is a fuel turned into a gas form in the internal space of the fuel tank and releasing the evaporated fuel to the outside of the fuel tank,
   a bulge space corresponding to an inside of the tank bulge portion is provided with an isolated body forming an isolated space that is isolated from the internal space of the fuel tank,
   a longitudinal direction of the isolated body extends along a direction with a shorter dimension of the generator in a plan view,
   an end part on one side of the pipe member is inserted into the internal space, and an end part on an other side of the pipe member is connected to a canister that collects the evaporated fuel,
   the end part on the one side of the pipe member is routed toward the isolated body in the internal space, is inserted through a bottom face of the isolated body, and is accommodated in the isolated space, and
   in the isolated body, at least one ventilation hole, which allows the isolated space and the internal space to communicate with each other, is provided at each of both ends in the longitudinal direction of the isolated body,
   wherein the ventilation holes are positioned above the liquid level of the liquid fuel when the generator topples over along the longitudinal direction of the isolated body.

2. The generator according to claim 1, wherein the ventilation holes are provided at a position higher than the lower end of the fuel pipe.

* * * * *